(12) United States Patent
Laury et al.

(10) Patent No.: US 11,673,512 B2
(45) Date of Patent: Jun. 13, 2023

(54) AUDIO PROCESSING METHOD AND SYSTEM FOR A SEAT HEADREST AUDIO SYSTEM

(71) Applicant: Faurecia Clarion Electronics Europe, Paris (FR)

(72) Inventors: Cyril Laury, Antony (FR); Nicolas Lopez Zuleta, Montreuil (FR); Mounira Rigaud-Maazaoui, Paris (FR)

(73) Assignee: Faurecia Clarion Electronics Europe, Paris (FR)

( * ) Notice: Subject to any disclaimer, the term of this patent is extended or adjusted under 35 U.S.C. 154(b) by 7 days.

(21) Appl. No.: 17/536,016

(22) Filed: Nov. 27, 2021

(65) Prior Publication Data

US 2022/0169186 A1   Jun. 2, 2022

(30) Foreign Application Priority Data

Nov. 27, 2020  (FR) .................................... 20 12272

(51) Int. Cl.
| | | |
|---|---|---|
| *H04S 7/00* | (2006.01) | |
| *B60R 11/02* | (2006.01) | |
| *H04R 1/02* | (2006.01) | |
| *H04R 1/20* | (2006.01) | |

(Continued)

(52) U.S. Cl.
CPC .......... *B60R 11/0217* (2013.01); *H04R 1/025* (2013.01); *H04R 1/20* (2013.01); *H04R 3/12* (2013.01); *H04R 5/023* (2013.01); *H04S 7/303* (2013.01); *H04S 7/307* (2013.01); *H04R 2205/024* (2013.01); *H04R 2499/13* (2013.01)

(58) Field of Classification Search
CPC . H04R 1/025; H04R 1/20; H04R 3/12; H04R 5/023; H04R 2205/024; H04R 2499/13; H04S 7/303; H04S 7/307; B60R 11/0217; B60N 2/879
See application file for complete search history.

(56) References Cited

U.S. PATENT DOCUMENTS

| | | | |
|---|---|---|---|
| 9,699,583 B1* | 7/2017 | Lyren | ...................... H04S 7/303 |
| 2010/0027805 A1 | 2/2010 | Itou et al. | |
| 2018/0295443 A1 | 10/2018 | Takada et al. | |

(Continued)

FOREIGN PATENT DOCUMENTS

WO    2020195084 A1    10/2020

OTHER PUBLICATIONS

French Search Report corresponding French Application No. FR 2012272, dated Jul. 27, 2021, 2 pages.

*Primary Examiner* — Jason R Kurr
(74) *Attorney, Agent, or Firm* — Reising Ethington P.C.

(57) ABSTRACT

An audio processing method and system for a seat headrest audio system, the audio system including at least two speakers positioned on opposite sides of the headrest, the method including detecting a position of the user's head and adjusting a first set of parameters of at least one audio processing operation as a function of that position. The method includes determining a user characteristic and/or temporary state of the user, selecting an audio settings profile related to that characteristic, the audio settings profile including a second set of prerecorded audio profile parameters, and adjusting a third set of audio parameters effectively applied to control the audio rendering of each speaker, based on the first and second sets of parameters.

12 Claims, 7 Drawing Sheets

(51) Int. Cl.
  *H04R 3/12* (2006.01)
  *H04R 5/02* (2006.01)

(56) References Cited

U.S. PATENT DOCUMENTS

| | | |
|---|---|---|
| 2019/0171409 A1 | 6/2019 | Boulanger et al. |
| 2019/0349683 A1* | 11/2019 | Anders .................... H04R 5/04 |
| 2020/0083856 A1 | 3/2020 | Tin Than et al. |
| 2021/0306788 A1* | 9/2021 | Kim ........................ B60N 2/002 |
| 2022/0174446 A1* | 6/2022 | Watanabe ................ H04S 7/302 |
| 2022/0404905 A1* | 12/2022 | Haelvoet .............. G06V 10/141 |

* cited by examiner

AUDIO PROCESSING METHOD AND SYSTEM FOR A SEAT HEADREST AUDIO SYSTEM

TECHNICAL FIELD

The present invention relates to an audio processing method and system for a seat headrest audio system.

The present invention also relates to a passenger transport vehicle, in particular a motor vehicle, comprising one or more seats, at least one seat being equipped with a headrest and such an audio system.

The invention is in the field of audio systems for vehicles, and in particular for passenger transport vehicles.

BACKGROUND

Audio systems for vehicles generally comprise one or more loudspeakers, adapted to emit sound signals, coming from a source, such as a car radio, into the vehicle interior. In the field of audio systems for vehicles, an important issue is that of improving the listening quality of the sound signals for the vehicle users.

To this end, audio systems are known that integrate one or more speakers into the seat headrest, for each or for a portion of the seats in a vehicle, to improve the audio experience of a user sat in a seat equipped with such a headrest.

In order to further improve the audio playback, the application of various audio processing operations is contemplated.

In particular, noise reduction systems are known, and active noise reduction or active noise control in particular. Active noise reduction or active noise control consists of applying filtering in an electronic transmission chain connected to the loudspeaker, the object of this filtering being to produce a signal cancelling noise picked up, so that it is emitted by the loudspeaker in order to cancel or reduce the noise picked up at a predetermined position (or in a predetermined zone).

Active noise reduction systems optimized for a spatial zone intended for the user's head, for example are known. However, in practice, users are not necessarily positioned in the intended position, and therefore the active noise reduction is suboptimal.

Improved active noise reduction systems are also known that determine the position of the user's head relative to the positions of the loudspeakers, so as to improve the sound rendition based on the detected position of the user's head.

SUMMARY

An object of the invention is to further improve the audio rendering for the user in a seat headrest audio system.

To this end, according to a first aspect, the invention proposes an audio processing method for a seat headrest audio system, the audio system comprising at least two speakers positioned on either side of the headrest, and a control module adapted to apply at least one audio processing operation and to control an audio rendering for each speaker, the method comprising detecting a position of the user's head and adjusting a first set of parameters of at least one audio processing operation, based on the detected position, to improve the audio rendition quality by said speakers for said user. The method further includes the steps of:

determining a user characteristic and/or a temporary state of the user, selecting an audio setting profile related to the user characteristic and/or temporary state of the user, said audio setting profile comprising a second set of prerecorded audio profile parameters adjusting a third set of audio parameters then applied, to control the audio rendering of each speaker based on said second set of prerecorded audio profile parameters and on said first set of parameters related to the detected position of the user's head.

Advantageously, the audio processing method for a headrest audio system according to the invention allows the audio processing operation to be optimized, based on both a user's head position and an audio setting profile related to a user characteristic and/or temporary state of the user. Thus, the audio rendering is more dynamically tailored to each user and provides increased comfort for the user.

The audio processing method for a headrest audio system according to the invention may also include one or more of the following characteristics, taken independently or in any technically feasible combination.

The audio setting profile also includes audio contents or an indication for accessing audio contents.

With each of said right and left speakers having a controlled audio volume, the second set of audio profile parameters includes an audio volume for at least one of said speakers.

Following determination of the position of the user's head, the method includes determination of a spatial zone occupied by the user's head from a plurality of predetermined spatial zones, and, for adjustment of said third set of audio parameters effectively applied, retrieving parameters for the determined spatial zone from said first set of previously stored audio processing operations.

The plurality of spatial zones comprises a central zone, at least one right zone, and at least one left zone.

The plurality of spatial zones further includes at least one frontal advancement zone, corresponding to a position offset on an axis orthogonal to a central portion of the seat headrest.

The method is implemented in an audio system comprising at least two microphones positioned on either side of the seat headrest comprising detection of movement of the user's head in a frontal advancement zone by analysis of a sound reception level in at least one of said microphones.

The audio processing operations include at least one of: a delay adjustment, a gain adjustment, equalization, sound spatialization, bass enhancement, active noise reduction, or active noise control.

A temporary state of the user is selected from the set comprising a nominal state, a resting state, a motion state, a sleeping state.

A user characteristic is chosen, between adult and child.

The method is implemented in a system comprising at least one image acquisition device, the determination of a user characteristic and/or temporary state of the user implementing an analysis of images acquired by said at least one image acquisition device.

According to another aspect, the invention relates to an audio processing system for a headrest audio system, the audio system comprising at least two speakers positioned on either side of the headrest, and a control module adapted to apply at least one audio processing operation and to control audio rendering for each speaker, the method comprising detection of movement of the user's head and adjusting a first set of parameters of at least one audio processing operation, based on the detected position, to improve the audio rendition quality by said speakers for said user by said speakers for said user, comprising at least one processor configured to implement:

a module for determining a user characteristic and/or temporary state of the user, a module for selecting an audio setting profile related to the user characteristic and/or temporary state of the user, said audio setting profile comprising a second set of prerecorded audio profile parameters a module for adjusting a third set of audio parameters effectively applied to control the audio rendering of each speaker, based on said second set of prerecorded audio profile parameters and said first set of parameters related to the detected position of the user's head.

The audio processing system for a headrest audio system is configured to implement the audio processing method for a headrest audio system briefly described above according to all variants thereof.

The advantages of the audio processing system are similar to the advantages of the audio processing method recalled above.

BRIEF DESCRIPTION OF THE DRAWINGS

Other features and advantages of the invention will be apparent from the description given below, by way of indication and not in any way limiting, with reference to the appended Figures, among which.

DETAILED DESCRIPTION

Figure 1:
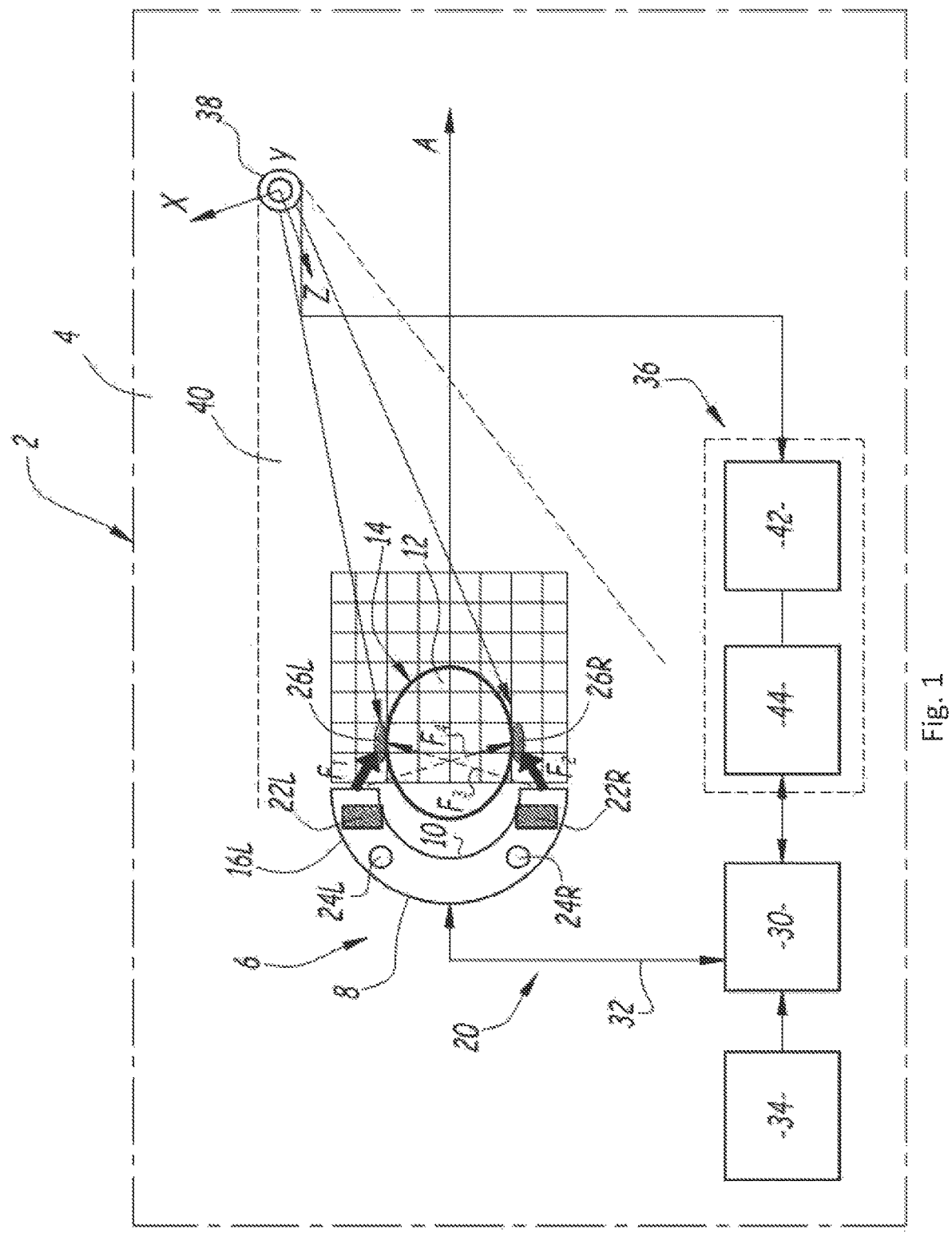
FIG. 1 is a schematic example of an audio processing system for a headrest audio system according to one embodiment of the invention.

In FIG. 1, a passenger transport vehicle 2 such as a motor vehicle is schematically illustrated.

The vehicle 2 comprises a passenger compartment 4 in which a plurality of seats, not shown, are located and at least one seat includes a headrest 6, coupled to a seat back, intended generally to support the head of the user seated in the seat.

Preferably, the vehicle 2 includes a plurality of seats having a headrest on the seat back.

For example, a motor vehicle 2 includes a front row of seats, a rear row of seats, and both front seats are equipped with a headrest 6. The motor vehicle may also include one or more intermediate rows of seats, located between the front row of seats and the rear row of seats.

In a variant, all seats are equipped with a headrest.

A headrest 6 includes a central body 8 of concave shape, for example, forming a support zone 10 for the head 12 of a user 14.

Further, as an optional addition, the headrest 6 includes two side flaps 16L, 16R, positioned on either side of the central body 8.

For example, in one embodiment, the side flaps 16L, 16R are fixed. In a variant, the side flaps 16L, 16R are hinged with respect to the central body 8, rotatable with respect to an axis, for example.

The headrest 4 is provided with a seat headrest audio system 20, including a number N of speakers 22 in particular, integrated in a housing of the headrest.

Preferably, the speakers are housed on either side of a central axis A of the headrest body 18, in the side flaps 16R, 16L, for example, when such side flaps are present.

In the example of FIG. 1, the audio system comprises 2 speakers, which are distinguished and noted 22L, 22R respectively.

Furthermore, in the embodiment shown in FIG. 1, the audio system 20 includes P microphones 24, each microphone being housed in a corresponding headrest housing. In the example, the audio system 20 includes two microphones 24R, 24L, positioned on opposite sides of the headrest.

In particular, these microphones 24L, 24R are adapted to pick up the pressure level of sound signals.

It is understood that if the user's head 12 is in a given centered position, as shown in FIG. 1, the distance between each ear 26L, 26R of the user and each speaker 22L, 22R is fixed and known, as well as the cross distances between ears 26L, 26R and speakers 22R, 22L. The transfer functions between ears and loudspeakers, dependent on the acoustic fields on the distances between ears and loudspeakers in particular, are shown in FIG. 1 by arrows: $F_1$ shows the transfer function between loudspeaker 22L and ear 26L; $F_2$ shows the transfer function between loudspeaker 22R and ear 26R. The cross-transfer functions are also shown: $F_3$ shows the transfer function between speaker 22L and ear 26R; $F_4$ shows the transfer function between speaker 22R and ear 26L.

The same is true with respect to the transfer functions between the user's ears 26L, 26R and each microphone 24L, 24R.

The audio system 20 further comprises an audio processing module 30, connected to the speakers N and the microphones P via a link 32, preferably a wired link. The audio processing module 30 receives audio signals from a source 34, for example a car radio or a non-volatile storage device for audio content in a suitable format, for example MP3, and implements various audio processing of the received audio signal.

According to the invention, the headrest audio system 20 includes an audio processing enhancement system 36, implementing detection of the user's head position and adjustment of a first set of parameters of at least one audio processing operation based on the detected position.

Further, the system 36 implements a determination of a user characteristic and/or temporary state of the user, to then select an audio setting profile related to the characteristic and/or temporary state of the user, the setting profile including a second set of pre-stored audio profile parameters, and an application of an adjustment of a third set of audio parameters effectively applied to control the audio rendering of each speaker based on the second set of audio profile parameters and the position of the user's head.

For example, the audio processing operation is a delay adjustment, gain adjustment, equalization, sound spatialization, bass enhancement, active noise reduction or active noise control, or any other sound operation to improve the quality of listening to music.

In one embodiment, multiple audio processing operations are implemented.

The audio system 20 includes an image acquisition device 38 associated with the headrest 6.

The image acquisition device 38 is an optical camera, for example, adapted to capture images in a given range of the electromagnetic spectrum, in the visible spectrum, the infrared spectrum, or the near infrared spectrum, for example.

In a variant, the image acquisition device 38 is a radar device.

Preferably, the image acquisition device 38 is adapted to capture two-dimensional images. In a variant, the image acquisition device 38 is adapted to capture three-dimensional images.

The image acquisition device 38 is positioned in the vehicle's passenger compartment 4, in a spatial position chosen so that the headrest 6 is in the field of view 40 of the image acquisition device 38.

For example, in one embodiment, the image acquisition device 38 is placed on or integrated into a housing of an element (not shown) of the passenger compartment 4, located in front of the seat on which the headrest 6 is mounted.

In one embodiment, the image acquisition device 38 is mounted in a fixed position, and its field of view is also fixed.

According to an alternative embodiment, the image acquisition device 38 is mounted in a movable position, on a movable part of the vehicle interior 4, seat or dashboard for example, the movement of which is known to an on-board computer of the vehicle.

The mounting position of the image acquisition device 38 is chosen so that translational and/or rotational movements of the head 12 of the user 14, from the centered position shown in FIG. 1, remain within the imaging field 40 of the image acquisition device 38.

Figure 2:
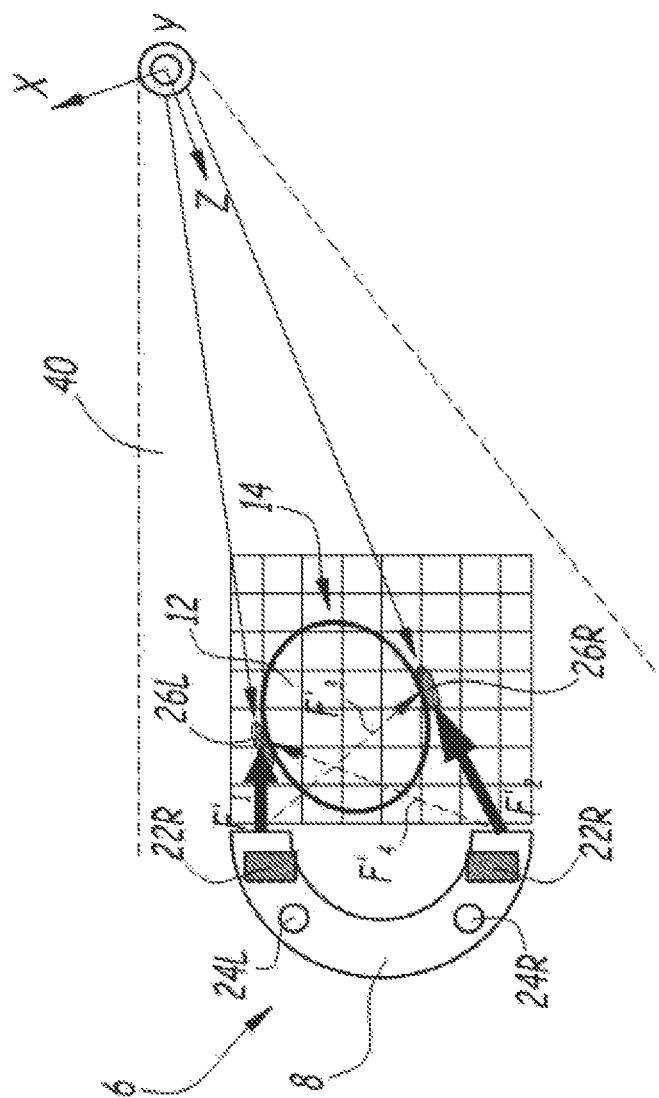
FIG. 2 schematically illustrates a user's head movement within a predetermined reference frame.

This movement of the head 12 of the user 14 is illustrated schematically in FIG. 2.

As can be noted in FIG. 2, a rotational and/or translational movement of the head 12 of the user 14 specifically modifies the distances between each ear 26R, 26L of the user 14 and the corresponding loudspeaker 22R, 22L, and consequently the transfer functions, shown by arrows $F'_1$, $F'_2$, $F'_3$, and $F'_4$ in FIG. 2, are modified with respect to the transfer functions corresponding to the centered position, shown by arrows $F_1$, $F_2$, $F_3$, and $F_4$ of FIG. 1.

A three-dimensional (3D) spatial reference frame, with center O and axes (X, Y, Z), orthogonal in pairs, is related to the image acquisition device 38. This 3D reference frame is chosen, in one embodiment, as the spatial reference frame in the audio processing method implemented by the audio system 20 of the headrest 4.

The system 36 further comprises a device 42 for detecting the position of the user's head and for determining a user characteristic and/or temporary state of the user.

The device 42 is connected to the image acquisition device 38, by a wire link for example.

This device 42 is configured to detect the position of the user's head, for example in the 3D reference frame, from images acquired by the image acquisition device 38, by implementing digital image processing. The detection of the position of the user's head is performed at regular time intervals, and thus, tracking of the position of the user's head is obtained.

Further, in one embodiment, the device 42 is further configured to determine the spatial zone of the user's head from a plurality of predetermined spatial zones.

Figure 3:
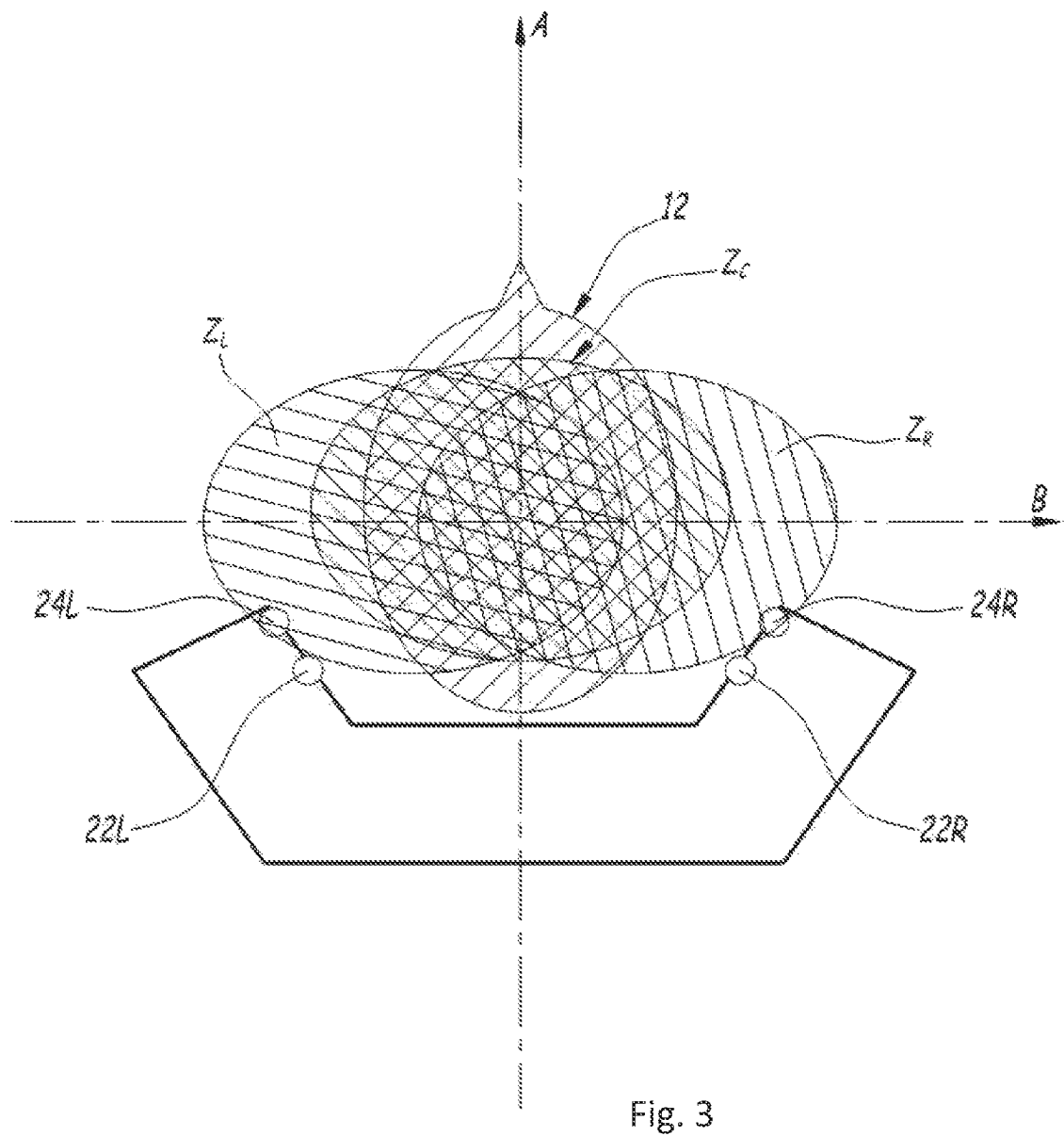
FIG. 3 schematically illustrates predetermined lateral spatial zones.

For example, the plurality of predetermined spatial zones respectively includes a central zone $Z_C$, at least one right side zone $Z_R$, and at least one left side zone $Z_L$, as schematically illustrated in FIG. 3.

Figure 4:
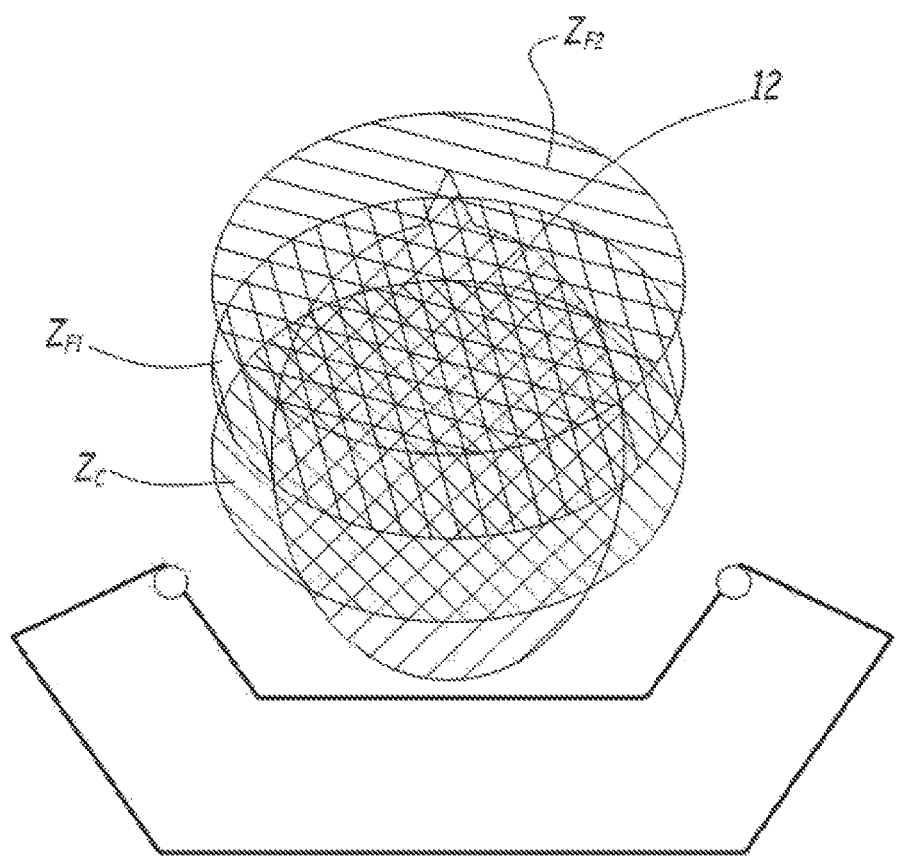
FIG. 4 schematically illustrates predetermined frontal advancement zones.

In addition, the plurality of predetermined spatial zones also includes a first frontal advancement zone $Z_{F1}$ and a second frontal advancement zone $Z_{F2}$, as schematically illustrated in FIG. 4.

In an alternative embodiment not shown, the device 42 is integrated into the image acquisition device 38.

According to another embodiment, the device 42 is also connected to the audio processing module 30 and is configured to determine the positioning of the user's head in one of the frontal advancement zones, $Z_{F1}$ or $Z_{F2}$, based on an analysis of a sound reception level in one or each microphone 24L, 24R; as explained in more detail below.

The device 42 is further configured to determine a user characteristic and/or temporary state of the user.

For example, an adult or child user characteristic is chosen.

For example, a temporary state of the user is a nominal state or a motion state or a resting state, or a sleeping state.

In one embodiment, the device 42 determines a user characteristic and/or a temporary state of the user by image/video processing methods acquired by the image acquisition device 38.

The system further comprises a device 44 for adjusting the third set of audio parameters effectively applied to control the audio rendering of each speaker, based on the user's head position and an audio setting profile, based on the user characteristic and/or temporary state of the user.

The adjusted audio parameters of the third set of parameters are effectively applied for improved audio rendering, tailored to both the user's head position and temporary state and/or characteristic.

In one embodiment, the device 44 is a signal processing processor, such as a DSP (for "digital signal processor") integrated into the audio processing module 30.

Figure 5:
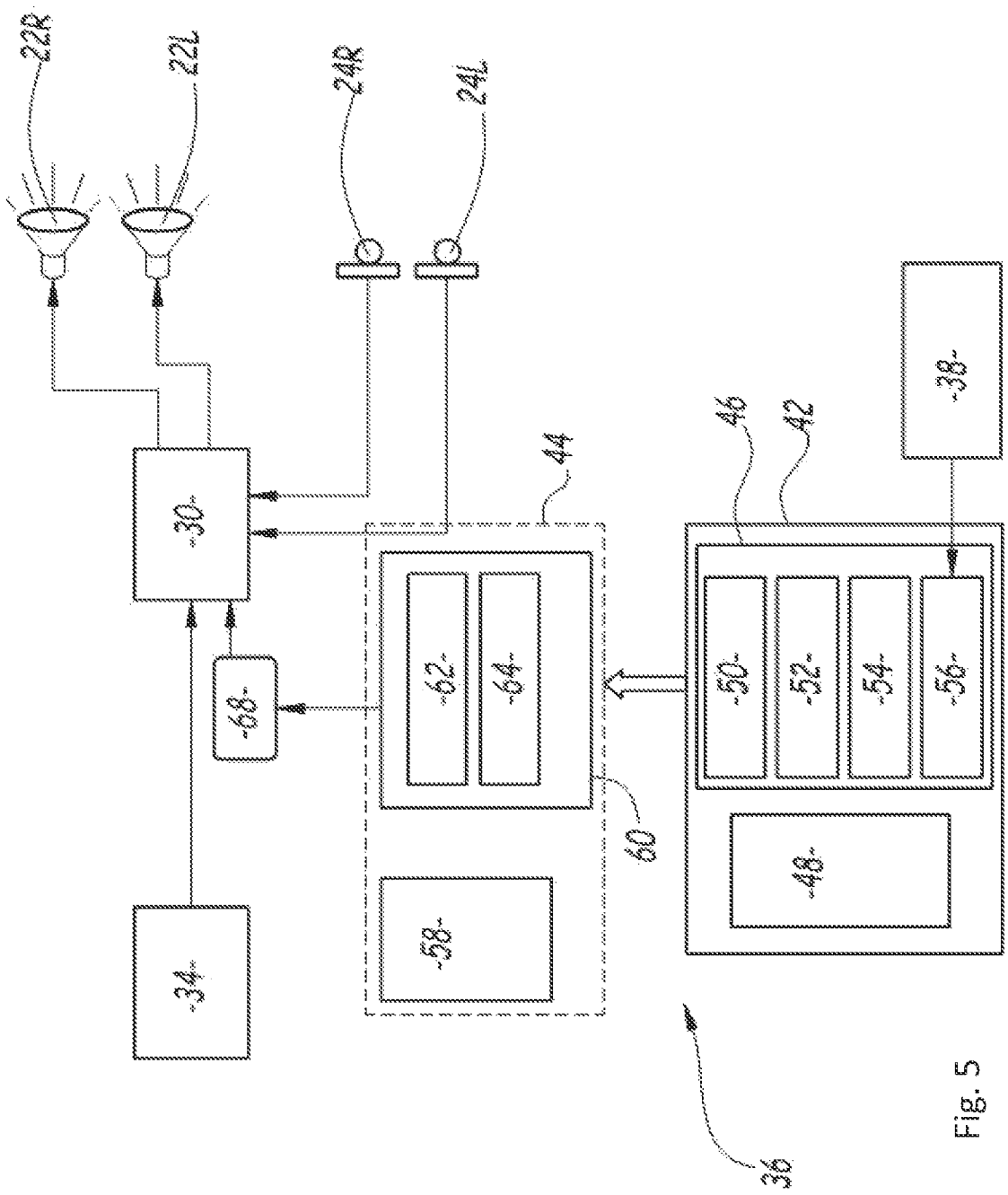
FIG. 5 is a schematic view of an audio processing system according to an embodiment of the invention.

FIG. 5 is a schematic representation of a seat headrest audio system, in which the device 42 for detecting the head position and determining a user characteristic and/or a temporary state of the user, and the device 44 for determining adjustment of the third set of audio parameters, effectively applied to control the audio rendering of each speaker, are detailed more specifically.

The device 42 includes a processor 46 such as a GPU (Graphics Processing Unit) type processor, specialized in image processing, and an electronic memory unit 48, for example an electronic memory, such as RAM or DRAM.

When the device 42 is powered on, the processor 46 is adapted to implement an image acquisition module 50, a module 52 for determining the position of the user's head in a lateral spatial zone, for example by image processing, a module 54 for determining the position of the user's head in a frontal advancement zone, for example by analyzing a sound reception level of one or each microphone, and a module 56 for determining a user characteristic and/or a temporary state of the user.

In one particular embodiment, the module 52 extracts markers representing morphological characteristics of a user's head, generates a 3D model representing the user's head and computes the position of each user's ear in a 3D reference frame. In this case, spatial coordinates for each of the user's ears are obtained, in the 3D reference frame, and identification of the position of the user's head with respect to a plurality of predetermined spatial zones is facilitated.

These modules 50, 52, 54, 56 are implemented as software, for example.

Each software is adapted to be recorded on a non-volatile support, readable by a computer, such as an optical disk or card, a magneto-optical disk or card, a ROM, RAM for example, any type of non-volatile memory (EPROM, EEPROM, FLASH, NVRAM).

In a variant, these modules 50, 52, 54, 56 each take the form of a programmable logic component, such as an FPGA or an integrated circuit.

The device 44 for determining adjustment of the third set of audio parameters effectively applied to control the audio rendering of each speaker is a programmable device comprising a processor 58 and an electronic memory unit 60 such as an electronic memory, such as RAM or DRAM.

In one embodiment, the processor 58 is a DSP, adapted to implement a module 62 for retrieving a second set of audio profile parameters pre-registered in audio setting profiles related to characteristic user states, and a module 64 for adjusting audio processing operation parameters, depending on the position of the user's head and the second set of audio profile parameters.

The modules 62, 64 are implemented as software, for example.

Each of these software programs is adapted to be recorded on a non-volatile, computer-readable medium, such as an optical disk or card, a magneto-optical disk or card, ROM, RAM, any type of non-volatile memory (EPROM, EEPROM, FLASH, NVRAM).

In a variant, these modules 62, 64 are each implemented as a programmable logic component, such as an FPGA or integrated circuit.

The third set of adjusted audio parameters 68 is provided to the audio processing module 30.

The audio processing module 30 implements an audio processing operation, using adjusted audio parameters of the third set of audio parameters.

The audio processing module 30 also implements other known audio filtering, which is not described in detail here, as well as digital-to-analog conversion and amplification, to provide a processed audio signal to the speakers 22L, 22R.

When the audio processing operation is active noise reduction, audio signals picked up by the microphones 24R, 24L are also used by the audio processing operation.

Figure 6:
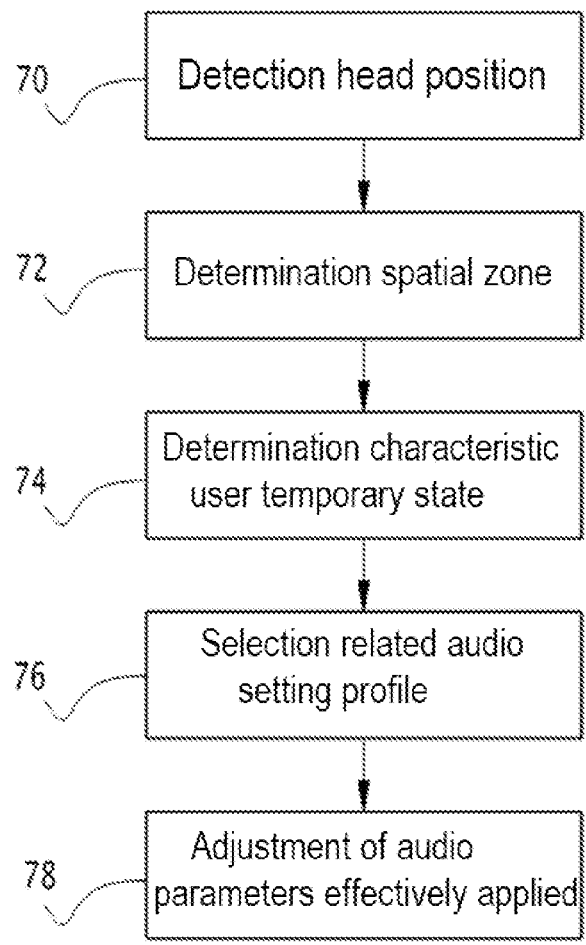
FIG. 6 is a flow chart of the main steps of an audio processing method in one embodiment of the invention.

FIG. 6 is a flow chart of the main steps of an audio processing method for seat headrest audio system according to an embodiment of the invention, implemented in a processing system as described above.

The method includes a first step 70 of detecting the position of the user's head, followed by a step 72 of determining a corresponding spatial zone from a plurality of predetermined spatial zones.

For example, the detection 70 of the position of the user's head is performed by successive image acquisition by an image acquisition device, such as a 2D or 3D camera, and an analysis of the acquired images, using morphological markers. Any image processing method for easy recognition and detection of the position of the user's head is conceivable for the implementation of this step.

In one embodiment, the analysis performed by image processing allows detection of a positioning of the user's head with respect to the central zone and the right and left lateral zones visible in FIG. 3, that is, a position of the head along an axis B.

In addition, the detection 70 of the position of the head along the axis A, orthogonal to the axis B, implements an analysis of the sound level received by each microphone placed in the seat headrest. In fact, when the user's head moves into one of the frontal advancement zones, the cross-audio transmission between the right speaker and the left microphone(s), as well as between the left speaker and the right microphone(s), is not attenuated by the user's head, and therefore the sound level received by each of the microphones is higher than when the user's head is close to the center support of the seat headrest.

The results of the detection step 70 are used to determine (step 72) in which of the set of predetermined spatial zones the user's head is located.

Additionally, optionally, when the method of detection of the user's head position provides the spatial position of the right ear and the spatial position of the left ear in a given frame of reference, these spatial positions are recorded.

The method then comprises a step 74 of determining a user characteristic and/or a temporary state of the user.

In particular, whether the user is a child or an adult is determined by analyzing images acquired by the image acquisition device, for example.

Determination of whether the user is a child or an adult is made and stored, for example.

In one embodiment, the distinction between an adult and a child is performed using the morphological markers extracted by the image acquisition device and a face classification algorithm, based on artificial intelligence, for example. For example, state of the art techniques for image-based age estimation can be used, such as the method described in the paper "Comparing different classifiers for automatic age estimation" by A. Lanitis et al, omitted in IEEE Transactions on Systems; Man and Cybernetics, volume 34, 2004.

Furthermore, the step 74 of determining a temporary user state implements a determination of a state from among a set of states, including: a nominal state, a resting state, a movement state or actively moving and a slowly moving state, a sleeping state. The determination of the temporary state is performed at regular intervals, for dynamic updating.

In one embodiment, determination of a temporary state of the user implements image processing in relation to the previously detected position of the user's head. For example, the positioning of the user's head in the central zone, with few detected movements, allows a nominal state to be detected.

The detection of successive jerky movements allows a state of movement to be detected, and an estimation of the frequency of the movements optionally allows an actively moving or slowly moving state to be detected.

A lateral positioning of the user's head, with a support on one of the right or left sides of the headrest, allows a resting position, and thus a resting user state to be detected.

For example, in a variant or in addition to the image analysis, data from pressure sensors added in the side flaps 16L, 16R of the headrest are received and processed to determine whether the user's head is resting on either side flap.

When the image analysis detects that the user's eyes are closed, a sleep state is detected. The position of the user's head in the sleep state can be either lying to the side or in the central zone.

Of course, the list of temporary user states here is given as an example; it is possible to add to it with other temporary states.

For each temporary state of the user, a related audio setting profile is previously stored.

Preferably, each audio setting profile includes a volume level to be applied in each speaker.

For example, when the user is in a resting state, the volume level of the speaker on the right or left side toward which the user's head is tilted is decreased from the nominal volume level. For example, a volume level within a predetermined range is applied.

For example, when the user's temporary state is a sleeping state, the volume level is decreased within a predetermined minimum range in both speakers. In addition, if the user's head pressing on one of the side flaps has been detected, the sound parameters are adjusted accordingly.

In addition, adding audio contents or an access to audio contents considered appropriate is provided for within the audio settings profiles. Thus, for the audio setting profile corresponding to the resting state or the sleeping state, relaxing/calm audio contents are added. Optionally, for the audio setting profile corresponding to the active movement state, rhythmic audio contents are added.

Each audio setting profile also includes information about sound spatialization, sound equalization, including balancing of high and low tones.

Moreover, in connection with the user characteristic, differentiating between a "child" audio profile and an "adult" audio profile is provided for.

It should be noted that the audio setting profiles related to the (child or adult) user characteristic and to the user's temporary state can be combined, so the audio setting profile will be adapted both for an adult or a child, and for his/her temporary state.

The step 74 of determining a characteristic and/or temporary state of the user is followed by a step 76 of selecting corresponding audio setting profile(s), from a memory, from the set of predetermined audio setting profiles.

Finally, an adjustment 78 of the third set of audio parameters effectively applied is implemented, taking into account the user's head position and the user's characteristic and/or temporary state.

Figure 7:
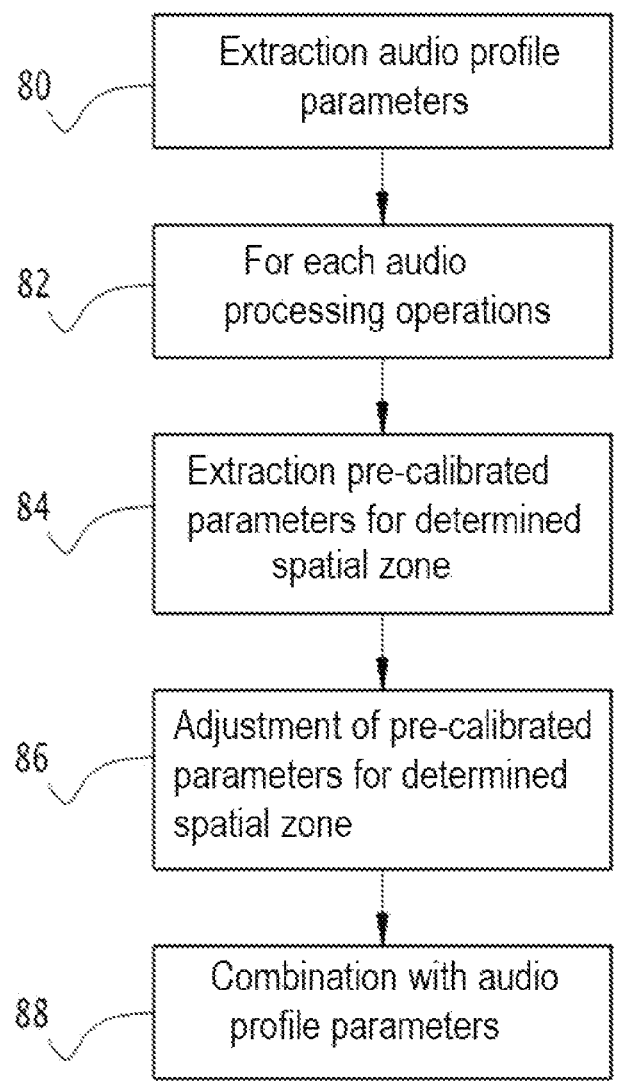
FIG. 7 is a flowchart of the steps for adjusting the audio parameters in one embodiment of the invention.

One embodiment of step 78 will be detailed below with reference to FIG. 7.

The second set of audio profile parameters is extracted in the extraction step 80 from the selected audio setting profile (s), based on the temporary state and characteristic of the user.

In addition, a plurality of audio processing operations are contemplated.

The audio processing operations contemplated include delay adjustment, gain adjustment, equalization, sound spatialization, bass enhancement, for example.

When the user's head is located in the central zone, and the user is in a nominal state, so-called nominal audio processing is provided.

In one embodiment, the nominal processing includes the following operations:
  delay adjustment: no delay is added between the speakers;
  gain adjustment: same gain applied for both left and right channels;
  equalization: equalization applied with respect to a reference frequency curve;
  spatialization: spatialization is intended for sound perception around the user's head in the central spatial zone;
  bass enhancement: bass enhancement to improve psychoacoustic perception, such as by harmonic injection, active loudspeaker control, signal dynamics processing.

In addition, active noise control is also applicable.

For each envisaged audio processing operation (step 82), pre-calibrated parameters related to each spatial zone, such as filtering parameters, are recorded, forming a first set of parameters.

In particular, the delay adjustment is modified as a function of the distance of each ear from the speaker, so as to maintain an audio perception centered on the user's head.

Similarly, the gain is adjusted by reducing the gain for the speaker closest to the user's head, with the gain increasing for the speaker farthest away from the user's head, when the user positions his/her head in one of the side zones.

When the user moves his head to one of the frontal advancement zones, the sound equalization as well as the spatialization is adjusted. The filtering parameters (e.g. adequate filtering coefficients) are calculated and stored.

The first set of pre-calibrated parameters for the spatial zone in which the user's head is located, determined in step 72, is retrieved in step 84.

According to one optimized embodiment, the first extracted set of pre-calibrated audio parameters are adjusted, based on the actual position of the head, including the positions of each of the user's right or left ears, in adjustment step 86.

Next, a combination 88 of the third set of adjusted audio parameters and the second set of audio profile parameters extracted in step 80 is made.

For example, one of the contents of the audio setting profile is selected, and the third set of adjusted audio parameters, along with the sound volume levels specified in the audio setting profile is selected are applied. The actual applied audio parameters are transmitted to the audio processing module 30.

For example, when the user is in the resting state, the delay adjustment is applied by adding a delay to the audio channel on the right or left side toward which the user's head is tilted, and decreasing the gain on that same side. Possibly, the gain on the opposite left or right side is increased. For example, sound equalization and bass enhancement when the user is in the resting state are applied with the same parameters as in the nominal audio processing. For example, sound spatialization is applied taking into account a rotation angle of the user's head from the nominal position in the central zone.

For example, when the user is in a sleeping state, the corresponding audio setting profile additionally includes relaxing/quiet audio content, and such content is selected. In addition, the gain is decreased on both audio channels, the sound equalization is adjusted to filter out frequencies above a threshold, at 8000 Hz, for example. With regard to bass enhancement, the reinforcement effects of certain sounds are cancelled. In addition, multiband compressors are applied to reduce transient effects such as snare sounds.

For a child audio setting profile, the gain for each channel is decreased in order to limit the sound volume, and the sound equalization is adjusted in the high frequencies, in order to better adapt the sound perception to the auditory characteristics of children, in particular to protect the hearing of children.

Advantageously, the determination of a temporary state of the user is repeated dynamically, at a given frequency, allowing for dynamic adaptation of the audio system, to maximize comfort for the user.

The invention claimed is:

1. An audio processing method for a seat headrest audio system, the audio system comprising at least two speakers positioned on opposite sides of the headrest, and a control module adapted to apply at least one audio processing operation and to control an audio output for each speaker, the method comprising detecting a position of the user's head and adjusting a first set of parameters of at least one audio processing operation based on the detected position, to improve a quality of audio rendition by the speakers for said user, comprising:
- determining a user characteristic and/or temporary state of the user,
- selecting an audio setting profile related to the user characteristic and/or temporary state of the user, the audio setting profile comprising a second set of prerecorded audio profile parameters,
- adjusting a third set of audio parameters effectively applied to control the audio rendering of each speaker, based on the second set of prerecorded audio profile parameters and the first set of parameters related to the detected position of the user's head.

2. The method according to claim 1, wherein the audio setting profile also includes audio contents or an indication to access audio contents.

3. The method according to claim 1, each of the speakers having a controlled volume, wherein the second set of audio profile parameters comprises a volume for at least one of the speakers.

4. The method according to claim 1, comprising, following a detection of the position of the user's head, determining a spatial zone occupied by the user's head from among a plurality of predetermined spatial zones, and, for adjustment of the third set of effectively applied audio parameters, extracting parameters for the determined spatial zone from the first set of previously stored audio processing operation.

5. The method according to claim 4, wherein the plurality of spatial zones comprises a central zone, at least one right side zone, and at least one left side zone.

6. The method according to claim 4, wherein the plurality of spatial zones further includes at least one front advancement zone, corresponding to a position offset on an axis orthogonal to a central portion of the seat headrest.

7. The method according to claim 6, implemented in an audio system comprising at least two microphones positioned on either side of the seat headrest, comprising detection of movement of the user's head in a frontal advancement zone by analysis of a sound reception level in at least one of the microphones.

8. The method according to claim 1, wherein the audio processing operations include at least one of: delay adjustment, gain adjustment, equalization, sound spatialization, bass enhancement, active noise reduction or active noise control.

9. The method according to claim 1, wherein a temporary state of the user is selected from the set comprising a nominal state, a resting state, a motion state, a sleeping state.

10. The method according to claim 1, wherein a user characteristic is selected from adult and child.

11. The method according to claim 1, implemented in a system comprising at least one image acquisition device, the determination of a user characteristic and/or temporary state of the user implements an analysis of images acquired by the at least one image acquisition device.

12. An audio processing system for a seat headrest audio system, the audio system comprising at least two speakers positioned on opposite sides of the headrest, and a control module adapted to apply at least one audio processing operation and to control an audio output for each speaker, the method comprising detecting a position of the user's head and adjusting a first set of parameters of at least one audio processing operation based on the detected position to improve a quality of audio rendition by the speakers for said user, comprising at least one processor configured to implement:
- a module for determining a user characteristic and/or temporary state of the user,
- a module for selecting an audio setting profile related to the user characteristic and/or temporary state of the user, the audio setting profile including a second set of prerecorded audio profile parameters,
- a module for adjusting a third set of audio parameters effectively applied to control the audio rendering of each speaker, based on the second set of prerecorded audio profile parameters and the first set of parameters related to the detected position of the user's head.

* * * * *